US012793458B2

(12) United States Patent
Drake

(10) Patent No.: US 12,793,458 B2
(45) Date of Patent: Nov. 10, 2026

(54) SYSTEMS AND METHODS FOR AUTOMATED PAPERWORK

(71) Applicant: Decision Tree, LLC, Greeley, CO (US)

(72) Inventor: Brandon Lee Goodchild Drake, Greeley, CO (US)

(73) Assignee: Decision Tree, LLC, Greeley, CO (US)

( * ) Notice: Subject to any disclaimer, the term of this patent is extended or adjusted under 35 U.S.C. 154(b) by 493 days.

(21) Appl. No.: 18/477,903

(22) Filed: Sep. 29, 2023

(65) Prior Publication Data

US 2024/0112487 A1 Apr. 4, 2024

Related U.S. Application Data

(60) Provisional application No. 63/377,574, filed on Sep. 29, 2022.

(51) Int. Cl.
*G06V 30/24* (2022.01)
*G06V 30/412* (2022.01)

(52) U.S. Cl.
CPC .......... *G06V 30/248* (2022.01); *G06V 30/412* (2022.01)

(58) Field of Classification Search
None
See application file for complete search history.

(56) References Cited

U.S. PATENT DOCUMENTS 8,122,367 B2 2/2012 Krieger et al.
8,880,436 B2 11/2014 Chan
9,076,185 B2 7/2015 Orfano
10,140,263 B2 11/2018 Gagné-Langevin et al.
10,217,179 B2 2/2019 Rodriguez et al.
10,289,663 B2 5/2019 Thomas
10,671,806 B2 6/2020 Tsabba
10,769,303 B2 9/2020 Brannon et al.
10,880,299 B2 12/2020 Balogh et al.
11,244,072 B2 2/2022 Barday et al.
2015/0026136 A1* 1/2015 Rathod ................. G06F 16/122 707/692
2017/0372442 A1 12/2017 Mejias
(Continued)

FOREIGN PATENT DOCUMENTS

CA 2901703 C 7/2016
EP 3292469 B1 12/2020

*Primary Examiner* — Andrew H Lam
(74) *Attorney, Agent, or Firm* — Kenneth E. Horton; Barnes & Thornburg LLP

(57) ABSTRACT

This application relates to systems and methods for automating document creation from digital or analog user input, coupled with data tracking and artificial intelligence (AI) validation. The methods include multiple or single user input of text and documents into a portal; cloud storage of data and documents; automated evaluation and verification of user-inputted material; generation of documents from user-inputted information; tracking of progress of user-inputted and other materials; and compilation of documents to facilitate users and their representatives. The systems include an AI module capable of identifying key features of government documents; a module configured for adjusting document dimensions, skew, and resolution based on recognized features; a second AI module capable of extracting text, code, or other symbols from a the modified document; and a module configured for transforming those data into useable information. Other embodiments are described.

10 Claims, 12 Drawing Sheets

(56) References Cited

U.S. PATENT DOCUMENTS

| | | | | |
|---|---|---|---|---|
| 2018/0267949 | A1 | 9/2018 | Wilczek et al. | |
| 2020/0244605 | A1* | 7/2020 | Nagaraja ................ | G16H 50/30 |
| 2022/0086133 | A1* | 3/2022 | Killoran, Jr. ........ | H04L 63/0807 |
| 2023/0013380 | A1 | 1/2023 | Choi et al. | |

* cited by examiner

SYSTEMS AND METHODS FOR AUTOMATED PAPERWORK

This patent application claims priority of U.S. Provisional Application Ser. No. 63/377,574, filed on Sep. 29, 2022, the entire disclosure of which is hereby incorporated by reference.

FIELD

The present application generally relates to the automation of document creation from digital or analog user input. In particular, this application relates to systems and methods for producing formal documents from digital or analog user input by using data tracking and artificial intelligence (AI) data validation.

BACKGROUND

The legal profession—and other administrative professions—require large quantities of paperwork, often a product of administrative burden for some process (refugee claims, food stamp assistance, medical records, corporate records, etc.). Similar burdens may exist with civil or legal proceedings as well. To the extent that administrative tasks rely on data inputs and verification of those inputs, some aspects of those tasks can be automated. But some of the existing systems and methods for automating data inputs and verification of those inputs can create errors and inaccurate information.

BRIEF SUMMARY

This application describes systems and methods for automating document creation from digital or analog user input, coupled with data tracking and artificial intelligence (AI) data validation. The methods comprise the processes of receiving input associated with text and documents from a user, storing the received text and documents in a centralized server based on the type of inputted data, evaluating the stored text and documents against user-supplied information for cross-referencing using a partially or fully automated artificial intelligence system, tracking progress of the received text and documents, and generating new documents from the validated user input using predefined templates. The systems contain an input module for accepting multiple or single user input of text and documents; a centralized server storage of data and documents labeled by type submitted by multiple or single user input managed by a data aggregation module; a data verification artificial intelligence (AI) module configured for adjusting document dimensions, skew, and resolution based on recognized features of identification documents; an AI extraction module capable of extracting text, code, or other symbols from a the modified document; a quality verification module and evaluation of user-inputted material on a the cloud server or a separate device through cross-referencing documents with user-supplied information; a tracking module for tracking of progress of user-inputted information and other materials for document progress; and a document output module configured for generating documents with templates from user-inputted information.

BRIEF DESCRIPTION OF THE DRAWINGS

The following description can be better understood in light of the Figures that show various embodiments and configurations of the systems and methods described herein.

Figure 1A:
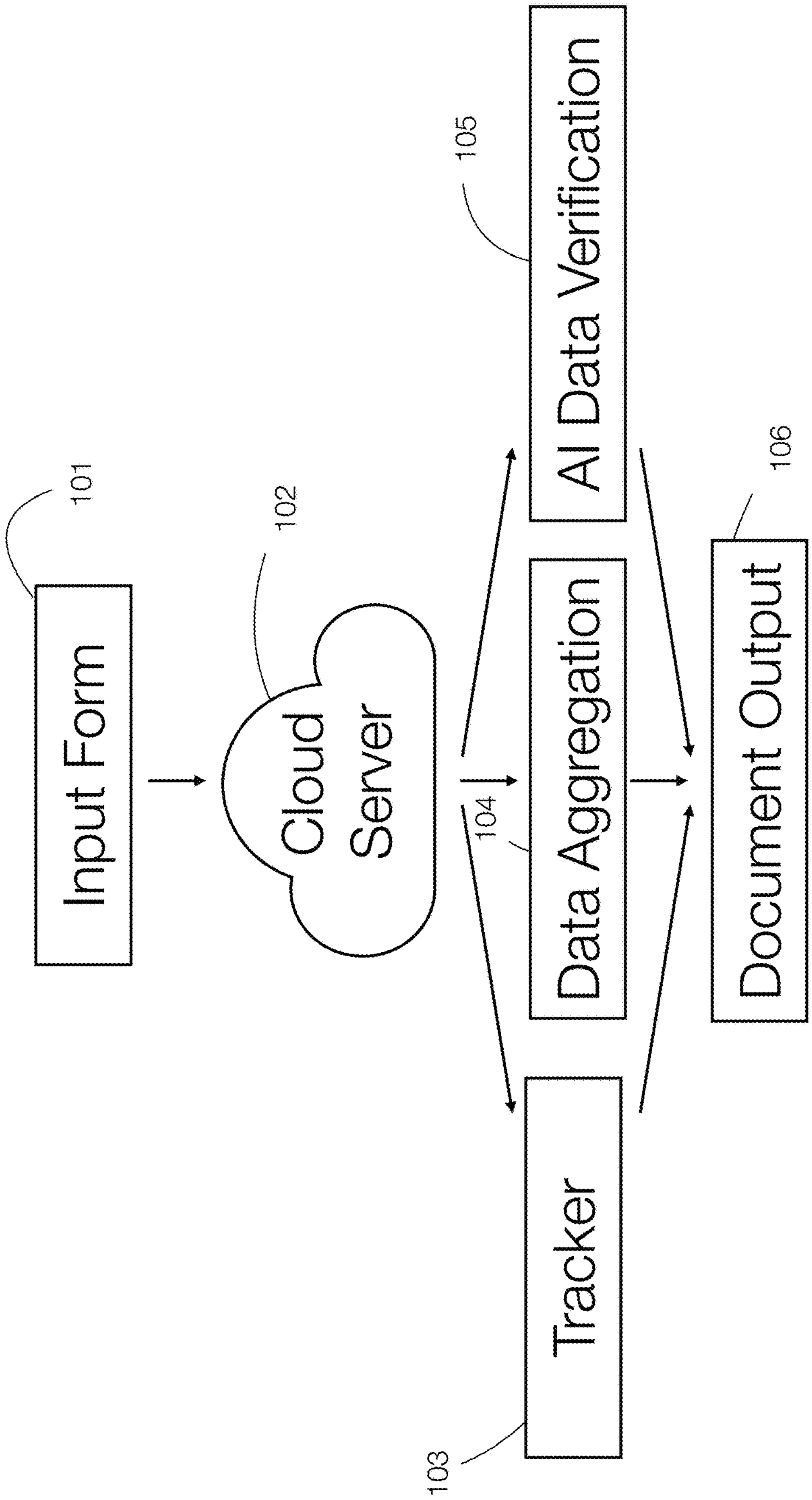
FIG. 1A shows some embodiments of the systems for automating document creation from digital or analog users.

Together with the following description, the Figures demonstrate and explain the principles of the systems and methods described herein. In the drawings, the thickness and size of components may be exaggerated or otherwise modified for clarity. The same reference numerals in different drawings represent the same element, and thus their descriptions will not be repeated. Furthermore, well-known structures, materials, or operations are not shown or described in detail to avoid obscuring aspects of the described systems and methods.

DETAILED DESCRIPTION

The following description supplies specific details in order to provide a thorough understanding. Nevertheless, the skilled artisan will understand that the described systems and methods can be implemented and used without employing these specific details. Indeed, the described systems and methods for using touchpads with multiple surfaces can be placed into practice by modifying the described systems and methods and can be used in conjunction with any other apparatus and techniques conventionally used in the industry. For example, while the description below focuses on processing legal documents, the described systems and methods could be used with medical documents, insurance documents, and any other industry where there is an administrative burden with paperwork.

In addition, as the terms on, disposed on, attached to, connected to, or coupled to, etc. are used herein, one object (e.g., a material, element, structure, member, etc.) can be on, disposed on, attached to, connected to, or coupled to another object—regardless of whether the one object is directly on, attached, connected, or coupled to the other object or whether there are one or more intervening objects between the one object and the other object. Also, directions (e.g., on top of, below, above, top, bottom, side, up, down, under, over, upper, lower, lateral, orbital, horizontal, etc.), if provided, are relative and provided solely by way of example and for ease of illustration and discussion and not by way of limitation. Where reference is made to a list of elements (e.g., elements a, b, c), such reference is intended to include any one of the listed elements by itself, any combination of less than all of the listed elements, and/or a combination of all of the listed elements. Furthermore, as used herein, the terms a, an, and one may each be interchangeable with the terms at least one and one or more.

In some embodiments, the methods for automating the creation of documents from digital or analog user input can begin when a user inputs data manually into a web form whether by user-typed info and/or uploading documents. The user data can be in the form of passports, national IDs, driver licenses, and/or other forms of federal or local government issued identification. In other embodiments, the user data can be in the form of medical or corporate documents. This user data is then stored on a server, which organizes all of the user data, including the documents. A data verification artificial intelligence (AI) module can analyze the user data to extract biographical information like names, birthdates, eye color, family history, medical history, place of residence, etc. The AI-extracted biographical information can be matched to the user data to identify potential errors or discrepancies. Any actual errors or discrepancies can be used to ask for re-submission of user data and/or issue an internal warning that a user might not be reliable. Administrative forms and paperwork can then be automatically filled out and generated using the properly verified data. If needed, the process can be iterated multiple times, with the generated documents also being used in the AI data verification module.

FIG. 1A shows some embodiments of the systems for automating the document creation from digital or analog user input. Users can input data into an input form 101 that then sends the inputted data to a cloud server 102. On the cloud server 102 three processes operate: first, a tracking module 103 to keep track of processed data and documents; second, a data aggregation module 104 to store data and files; and third, AI data verification module 105 to run document and data verification. These processes can be combined to produce an output document 106 that has been generated by the systems.

In some configurations, the input form 101 can be a web-based form or web application. In some embodiments, the system comprises a cloud server 102 configured to store data received from a user via the form 101. The cloud server 102 can be further configured to process the stored data using a data aggregation module 104. The data aggregation module 104 can receive the stored data from the cloud server 102, and process the data according to predefined rules or algorithms. In this manner, the systems and methods described herein can provide an efficient and scalable solution for managing user-inputted data in a cloud-based environment.

The cloud server 102 can employ a tracker module 103 which logs the progress for one or more documents outputted 106 for automated or manual facilitators of the process. This tracker module 103 can be used to simply track status, prioritize (e.g. assess effort needed to complete), or recognize key obstacles which can be remedied through using one or more input forms.

Figure 1B:
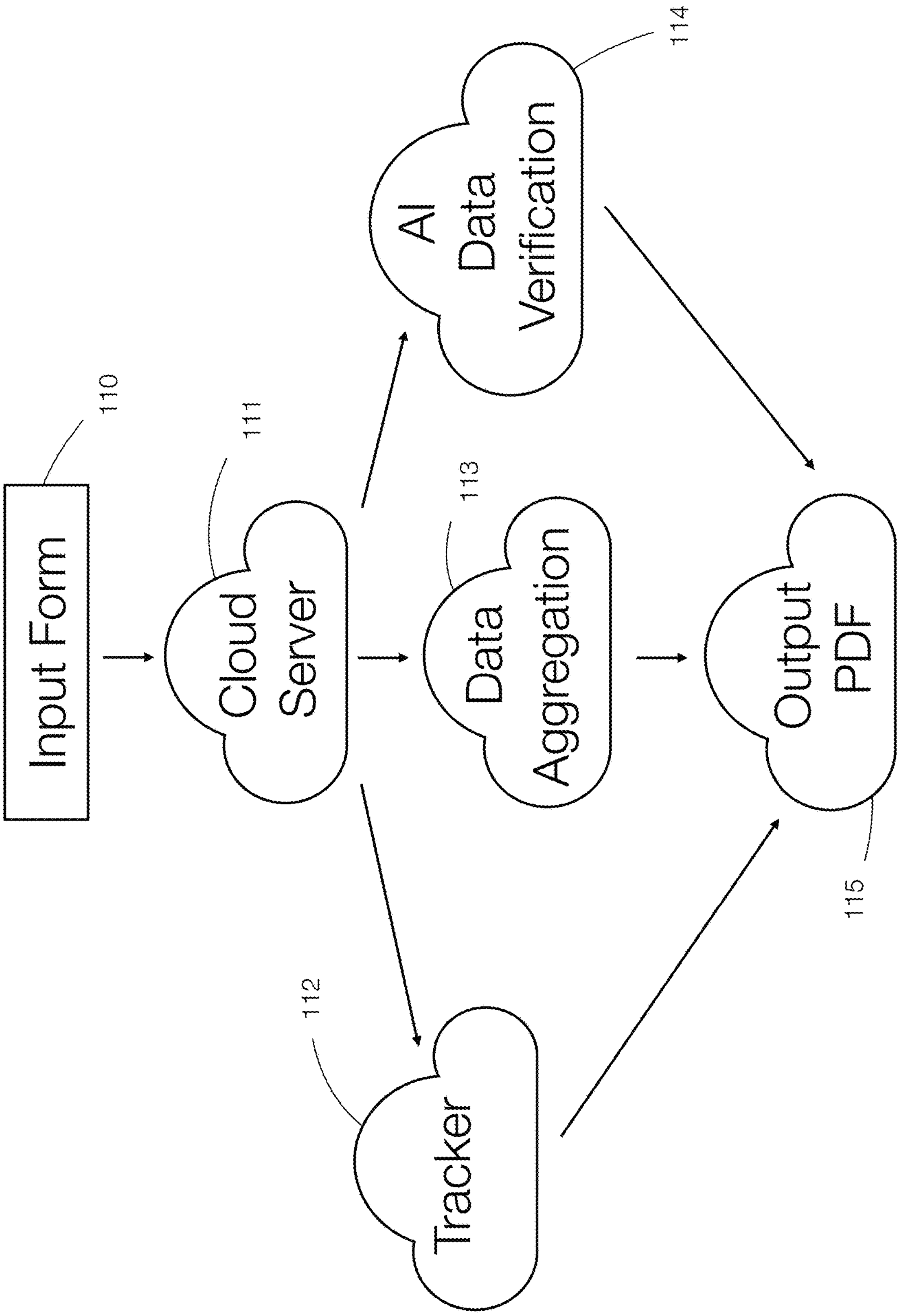
FIG. 1B shows other embodiments of the systems for automating document creation from digital or analog users.

FIG. 1B shows other embodiments of the systems for automating the document creation from digital or analog user input. Users can input data into a form 110 which then sends data to a cloud server 111. On the cloud server 111 three processes run on other servers: first, a tracking module 112 to keep track of processed documents; second, a data aggregation module 113 to store data and files and document; and third, AI data verification module 114 to run document and data verification. These processes can then combined to produce an output document 115. The components in FIG. 1B can be the same or different from those described and illustrated in FIG. 1A.

Figure 2:
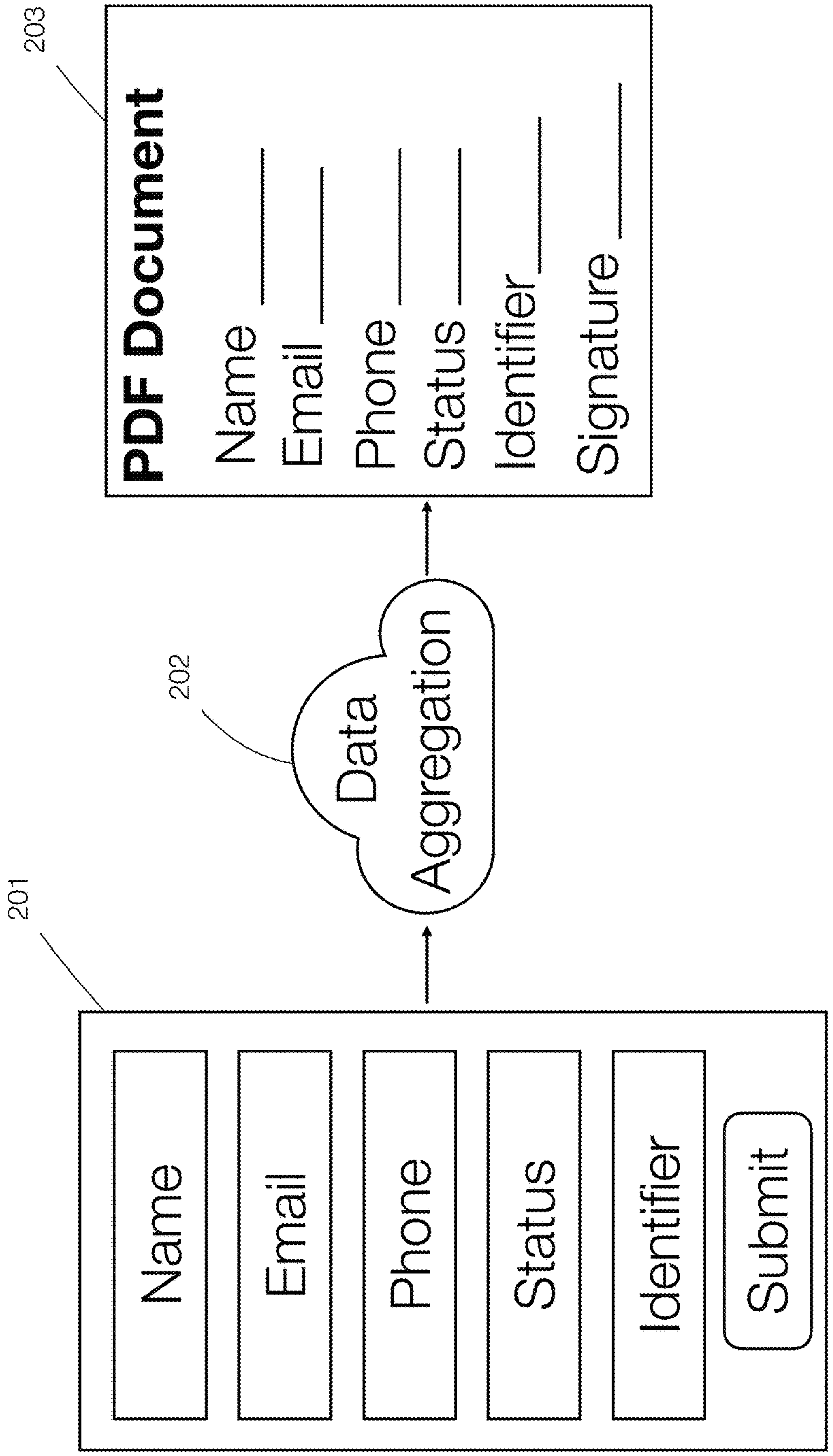
FIG. 2 shows an example of the data that can be captured by the systems for automating document creation from digital or analog users.

FIG. 2 shows some embodiments of basic data (biodata) that can be used in the systems for automating the document creation from digital or analog user input. As shown in FIG. 2, user data is gathered using an input form 201, processed by a data aggregation module 202, and converted into a output document 203 format. As shown in FIG. 2, user-inputted data can include many different types of a user interface, an example of a mobile touchscreen version, as shown in FIG. 2 201. In these embodiments, user-supplied data can be processed by the data aggregation module 202 to produce an output in a document or paperwork 203.

Figure 3:
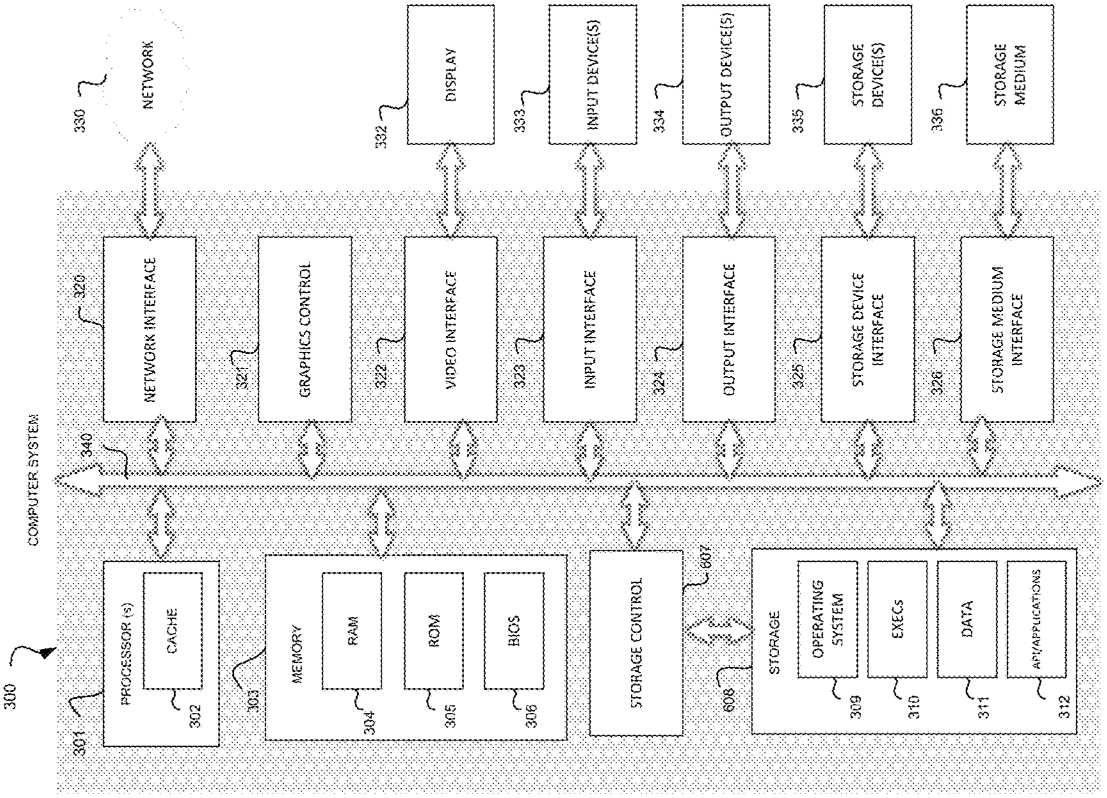
FIG. 3 shows an example of a computer system that can be used with the systems for automating document creation from digital or analog users.

The systems and methods described herein can be implemented in connection with any electronics, including the computer system illustrated in FIG. 3. This computer system can represent the user-facing device, cloud server, or other local device such as a touchscreen computer. Computer system 300 contains a set of non-transitory, processor executable instructions to perform or execute any of the methods described herein. The components in FIG. 3 are examples only and do not limit the use or functionality of any hardware, hardware combined with software, firmware, embedded logic component, or a combination of two or more such components. The computer system 300 can be implemented as a general purpose computer (e.g., a laptop computer), mobile device (e.g., tablet or smart phone), an application specific integrated circuit (ASIC), or an embedded logic device (e.g., an FPGA), to name just some non-limiting examples. As well, computer system 300 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Computer system 300 includes a processor 301 (or multiple processors) such as a central processing unit (CPU), graphical processing unit (GPU), application specific integrated circuit (ASIC), or a field programmable gate array (FPGA). The GPU may handle artificial intelligence modules, while the CPU handles more routine user inputs and document edits. However in other iterations the CPU may handle all tasks. The computer system 300 may also contain a memory component (or memory) 303 and a storage component (storage) 308 that communicate with each other and with other components via a bus 340. The bus 340 may also link one or more displays 332, one or more input devices 333 (e.g., a keypad, a keyboard, a mouse, a stylus, etc.), one or more output devices 334, one or more storage devices 335, and various non-transitory, tangible computer-readable storage media 336 with each other and with the processor 301, the memory 303, and the storage 308. All of these components can communicate directly or via one or more interfaces or adaptors to the bus 340. For example, the various non-transitory, tangible computer-readable storage media 336 can interface with the bus 340 via storage medium interface 326.

Processor(s) 301 optionally contains a cache memory unit 302 for temporary local storage of instructions or data. Processor(s) 301 can also execute computer-readable instructions stored on at least one non-transitory, tangible computer-readable storage medium. Computer system 300, as a result of the processor(s) 301, may also execute software embodied in one or more non-transitory, tangible computer-readable storage media, such as memory 303, storage 308, storage devices 335, storage medium 336 (i.e., read only memory or ROM), or the machine learning module 60. The non-transitory, tangible computer-readable storage media may store software that implements particular embodiments, and processor(s) 301 may execute the software.

Memory 303 may implement and/or execute the software from one or more other non-transitory, tangible computer-readable storage media (such as mass storage device(s) 335, 336) or from one or more other sources through any interface, such as network interface 320. The software may cause processor(s) 301 to carry the process(es) or step(s) of any process described herein. Executing such processes or steps may include defining data structures stored in memory 303 and modifying the data structures as directed by the software. In some embodiments, an FPGA can store instructions for carrying out the functionality while in other embodiments, firmware includes instructions for carrying out any functionality described herein.

The memory 303 may include various components (e.g., non-transitory, tangible computer-readable storage media) including random access memory component (e.g., RAM 304 whether static or dynamic RAM), a read-only component (e.g., ROM 305), and any combinations thereof. ROM 305 may communicate data and instructions unidirectionally to processor(s) 301, and RAM 304 may act to communicate data and instructions bidirectionally with processor(s) 301. ROM 305 and RAM 304 may include any suitable non-transitory, tangible computer-readable storage media. In some instances, ROM 305 and RAM 304 may include non-transitory, tangible computer-readable storage media for carrying out the methods described herein. A basic input/output system 306 (BIOS), including basic routines to transfer information between elements within computer system 300, may be stored in the memory 303.

Fixed storage 308 can be connected to processor(s) 301, optionally through storage control unit 307. Fixed storage 308 provides data storage capacity and may also include any suitable non-transitory, tangible computer-readable media described herein. Storage 308 may be used to store operating system 309, executable commands (EXEC) 310, data 311, API applications 312 (application programs), and the like. For example, multiple instances of the storage 308 could be used for storage by the machine learning module 60 or the like. In some configurations, storage 308 can be a secondary storage medium (i.e., a hard disk) that is slower than primary storage (i.e., memory 303). Storage 308 can also include an optical disk drive, a solid-state memory device (e.g., flash-based systems), or a combination thereof. Information in storage 308 may also be incorporated as virtual memory in memory 303.

In some configurations, storage device(s) 335 may be removably interfaced with computer system 300 (e.g., via an external port connector (not shown)) via a storage device interface 325. Thus, storage device(s) 335 and an associated machine-readable medium may provide nonvolatile and/or volatile storage of machine-readable instructions, data structures, program modules, and/or other data for the computer system 300. For example, software may reside completely or partially within a machine-readable medium on storage device(s) 335. In another example, software may reside, completely or partially, within processor(s) 301.

Bus 340 connects a wide variety of subsystems and/or components in the computer system 300. Bus 340 may encompass one or more digital signal lines serving a common function. Bus 340 may also comprise any type of bus structures including a memory bus, a memory controller, a peripheral bus, a local bus, and any combinations thereof, using any of a variety of bus architectures. Such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and/or any combinations thereof.

Computer system 300 may also include an input device(s) 333. A user of computer system 300 may enter commands and/or other data into computer system 300 via input device(s) 333. Examples of an input device(s) 333 include an alpha-numeric input device (keyboard), a tracking device (mouse), a touchpad, a touchscreen, a joystick, a gamepad, an audio input device (microphone), an optical scanner, a video or still image capture device (e.g., a camera), and any combinations thereof. Input device(s) 333 may interface with bus 340 via any number of input interfaces 323 including serial, parallel, game port, USB, FIREWIRE, or any combination thereof.

When computer system 300 is connected to a network 330, the computer system 300 may communicate with other electronic devices, such as mobile devices and enterprise systems, that are connected to network 330. Communications to and from computer system 300 may be sent through a network interface 320 which may receive incoming communications in the form of one or more packets (such as Internet Protocol (IP) packets) from network 330. Computer system 300 may then store the incoming communications in memory 303 for processing. Computer system 300 may also store outgoing communications in the form of one or more packets in memory 303 and communicate them to network 330 via network interface 320. Examples of the network interface 320 include a network interface card, a modem, and any combination thereof. Examples of a network 330 (or network segment 330) include a wide area network (WAN) (e.g., the Internet, an enterprise network), a local area network (LAN), a telephone network, virtual private network (VPN), a direct connection between two computing devices, and any combinations thereof. The network 330 may employ any wired and/or a wireless mode of communication.

Information and data can be displayed through a display(s) 332. Examples of a display 332 include a liquid crystal display (LCD), an organic liquid emitting diode (OLED), a cathode ray tube (CRT), a plasma display, and any combinations thereof. The display 332 can interface to the processor(s) 301, memory 303, fixed storage 308, as well as other devices (i.e., input device(s) 333) via the bus 340. The display 332 can be linked to the bus 340 via a video interface 322, and transport of data between the display 332 and the bus 340 can be controlled via graphics controller 321. The results presented by the AI modules 60 may also be displayed by the display 332.

The computer system 300 may include one or more other peripheral output devices 634 including an audio speaker, a printer, and any combinations thereof. Such peripheral output devices may be connected to the bus 340 via an output interface 324. Examples of an output interface 324 include a serial port, a parallel connection, a USB port, a FIREWIRE port, a THUNDERBOLT port, and any combinations thereof.

Computer system 300 may also provide functionality as a result of logic hardwired or otherwise embodied in a circuit, which may operate in place of or together with software to execute the process(es) or step(s) described herein. Software in the computer system 300 may encompass logic, and reference to logic may encompass software. As well, the non-transitory, tangible computer-readable medium may encompass a circuit (such as an IC) storing software for execution, a circuit embodying logic for execution, or both.

Within computer system 300, the same reference characters are used to refer to terminals, signal lines, wires, etc. and their corresponding signals. The terms signal and wire can represent one or more signals, e.g., the conveyance of a single bit through a single wire or the conveyance of multiple parallel bits through multiple parallel wires. And each wire or signal may represent unidirectional or bidirectional communication between two or more components connected by a signal or wire.

The various logical blocks, modules, and circuits described herein may be implemented or performed with a general purpose processor, a digital signal processor (DSP), ASIC, GPU, a FPGA or other programmable logic device, discrete gate or transistor logic, discrete hardware components, or any combination thereof designed to perform the functions described herein. A general purpose processor may be a microprocessor or may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other similar configuration.

Figure 4A:
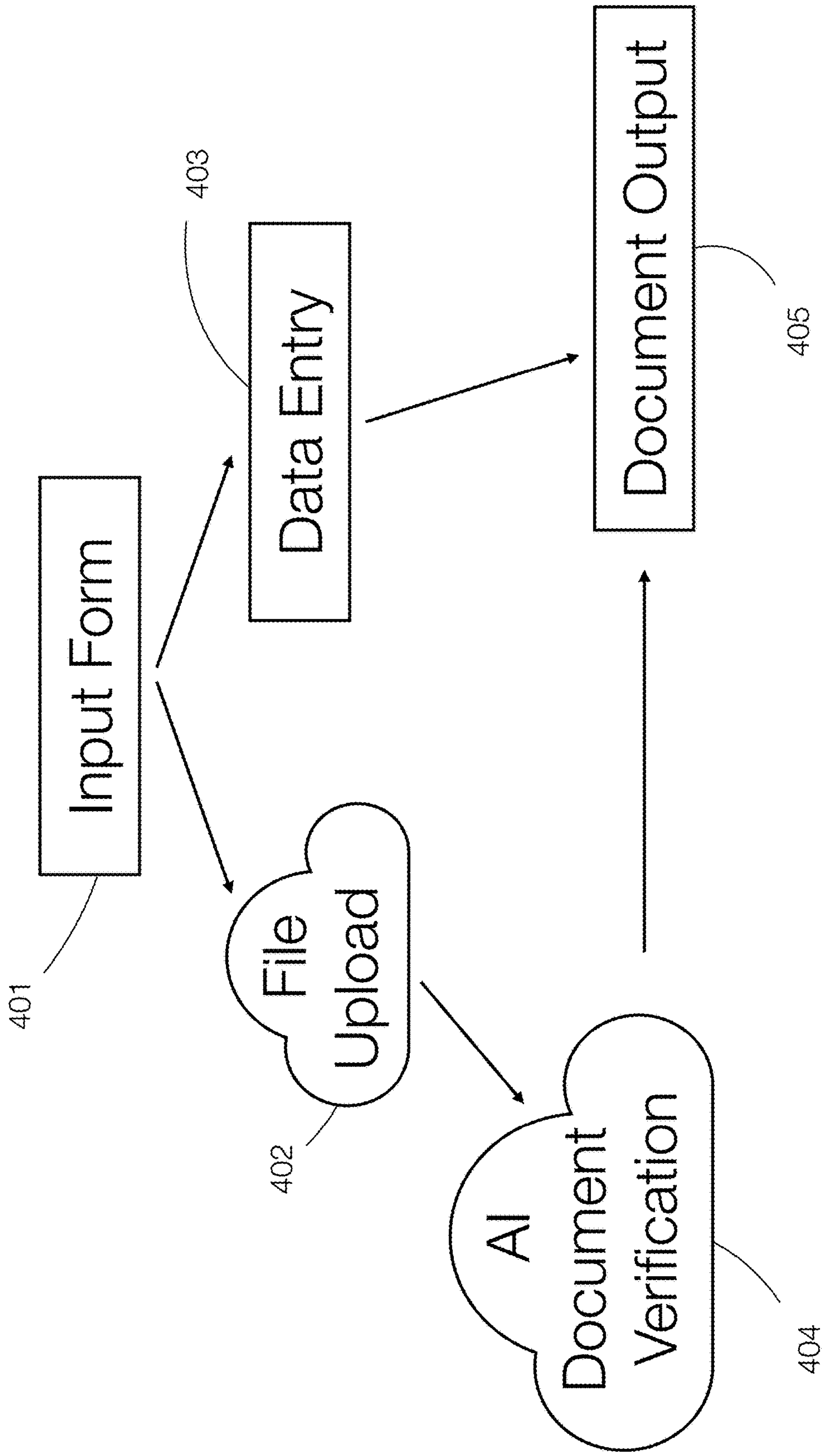
FIG. 4A shows some embodiments of the methods for automating document creation from digital or analog users.

FIG. 4A shows some configurations of the function of the data aggregation module in the systems for automating the document creation from digital or analog user input. In these configurations, data is received from the input form 401 that can include user-supplied documents 402 and user-inputted data via alphanumeric characters 403. User-supplied documents 402 can then be processed by an AI data verification module 404 which can be used independently or to cross-reference user-inputted data 403. These two independent data streams can then be integrated by the data aggregation module in the cloud server (not shown) to produce outputs 405 in the form of documents or other paperwork. In other configurations, an input form 401 data can be divided into two categories: uploaded files 402 and input data 403. An AI data verification process 404 verifies documents. A document output 405 is created from user inputted data 403 with key details verified by the AI data verification module 404.

Figure 4B:
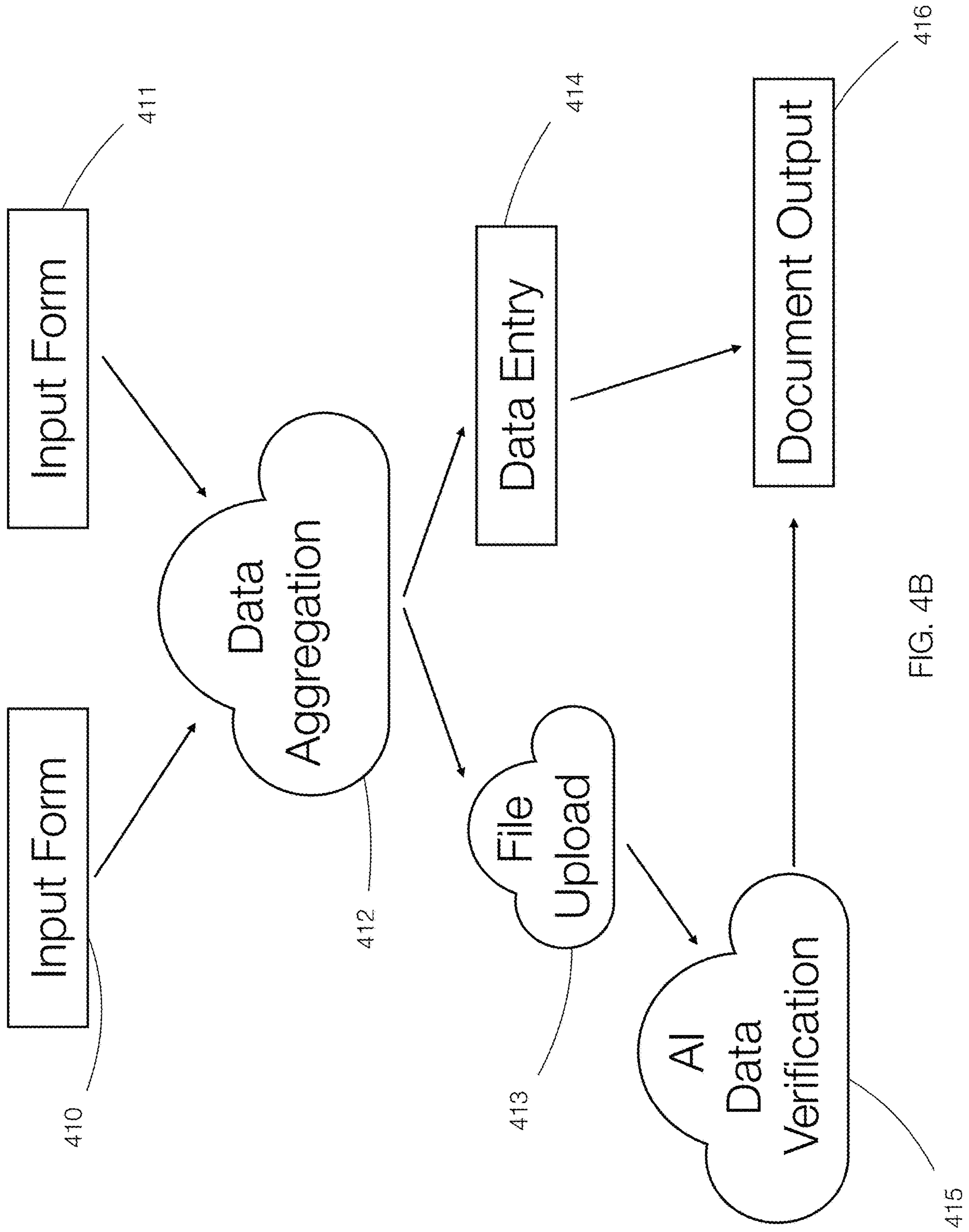
FIG. 4B depicts other embodiments of the methods for automating document creation from digital or analog users.

FIG. 4B shows other configurations of functions of the data aggregation module in the systems for automating the document creation from digital or analog user input. Two separate user inputs 410, 411 from one or more users are passed to a data aggregation module 412. From the data aggregation module 412, the data can divided into two categories; uploaded files 413 and user inputted data 414. An AI data verification module 415 verifies the data and documents. A document output 416 is created from user aggregated user inputs 412 with key details verified by the AI data verification module 416. Data can be received by two different users and/or user representatives or evaluator input modules 410, 411, which may or may not be concurrent in time. Both user input forms converge with a data aggregation module 412 which may be stored on a remote cloud server or a local device. The user-supplied documents 413 and user-inputted data via alphanumeric characters 414 are both stored in the data aggregation module 412. User-supplied documents 413 can then be processed by an AI data verification module 415 that can be used independently or to cross-reference user-inputted data 414. These two independent data streams can then be integrated in the cloud server to produce document outputs 416. One example of difference with the configurations in FIG. 4A and those in FIG. 4B is the situation in which the AI data verification module 415 flags an error, discrepancy, or issue which requires a later user input 411 which is joined to the original user input 410 in an data aggregation module 412 with the verification 415 and document output 416 processes re-iterating to a satisfactory conclusion. Such a mismatch between user-inputted data and documents could represent a flag as well on user reliability.

Figure 5:
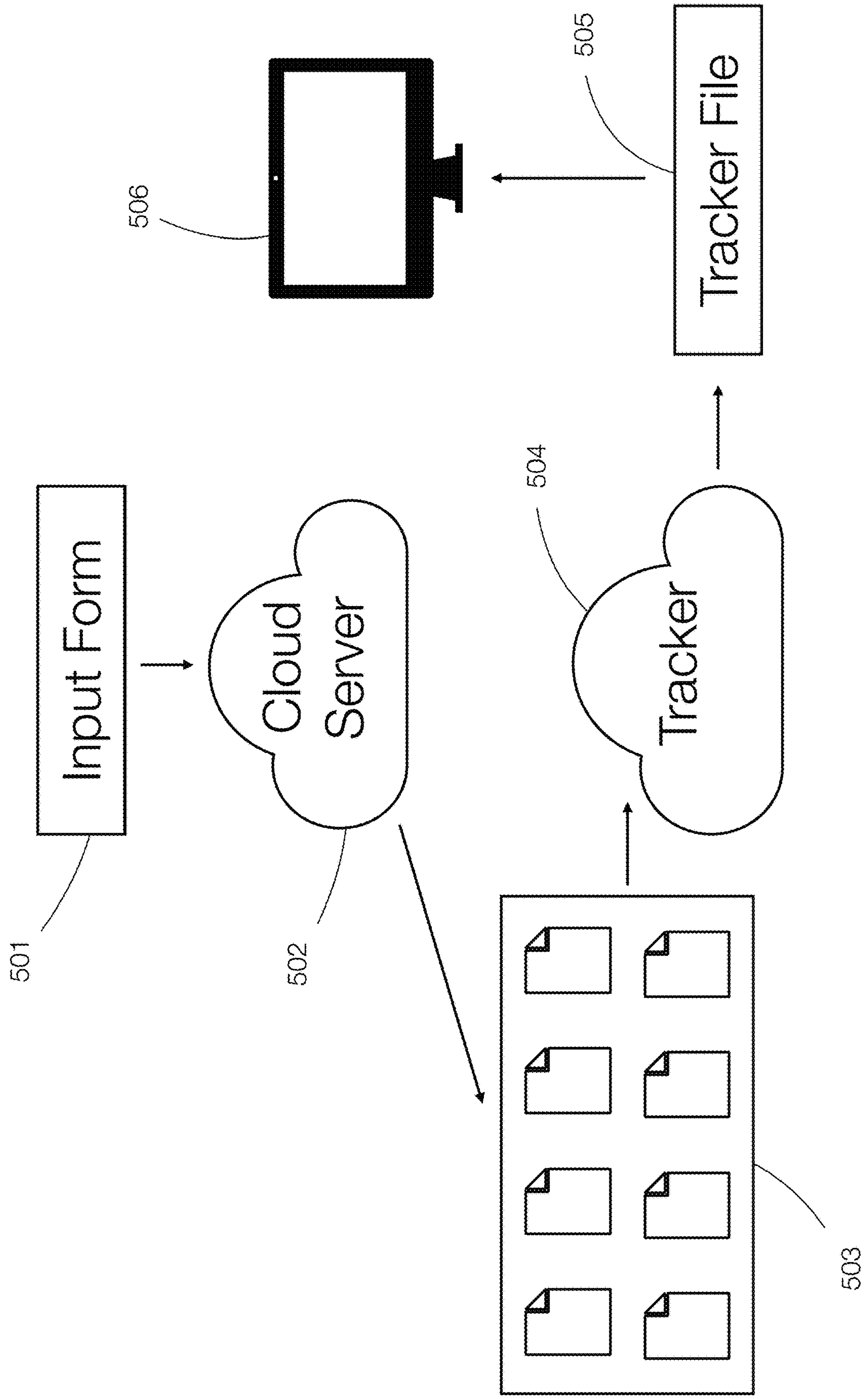
FIG. 5 shows yet other embodiments of the systems for automating document creation from digital or analog users.

FIG. 5 illustrates some embodiments of the tracking devices in the systems and methods for automating the document creation from digital or analog user input. User-inputted information 501 is sent to a cloud server 502, with this input including a number of documents outputted 503. The tracker module 504 can then assess document progress and provide a tracker file 505 that can be displayed on a local device 506 of either the original user or a representative/assistant to evaluate. In other configurations of the tracker module 504, data is acquired from an input form 501 and passed to a cloud server 502 that organizes and labels documents 503. The tracker module 504 evaluates characteristics of these documents 503 and produces a tracker file 505 that can be read directly by a user or input into an application or web interface 506.

Figure 6A:
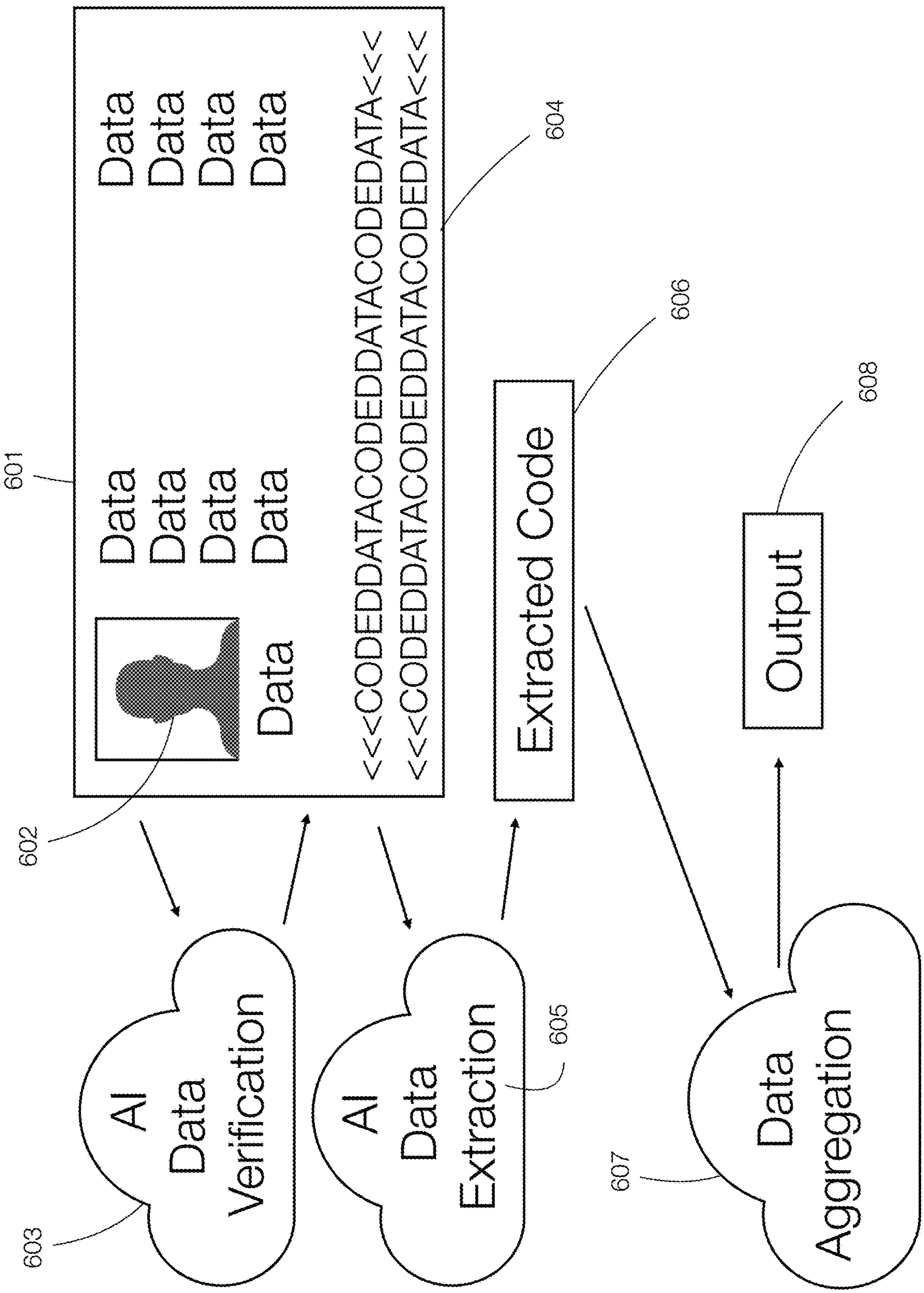
FIG. 6A depicts one example of a user-supplied document with data being input into the systems for automating document creation from digital or analog users.

FIG. 6A shows some configurations of the AI data verification module in the systems and methods for automating the document creation from digital or analog user input. The data input may include a photo scan of a federal or local government or corporate-issued document 601 with a photo 602 input into an AI data verification module 603. Note that data may also include other forms of issued ID or identifying documents, not all of which may include biometric data. AI data verification module 603 ensures proper orientation of the document for AI data extraction module 605 to extract the code 604 of the government document 601 to produce extracted code 606. The AI data verification module 603 may accomplish this in some embodiments by using key features of the face including biometrics based on facial features such as eyes, nose, mouth, and overall shape using convoluted neural networks or other algorithms. In other embodiments, the AI data verification module 603 may use elements of document layout such as bounding boxes, line dividers, known text associated with documents, and watermarks using support vector machines or other algorithms. Still other embodiments of the AI data verification module 603 may use both of these approaches in conjunction and flag based on both. Similarly, the AI data extraction module 605 may employ a single or multiple algorithms such as convoluted neural networks or other forms of Optical Character Recognition (OCR). This extracted code 606 is then evaluated by a data aggregation module 607 that produces output 608 that can be cross-referenced with user-inputted data. In some configurations, a user-supplied document (such as a passport 601) can be provided. This document may contain a profile of the user's face 602 or other biometric or biographic information (or data). An AI data verification module 603 employs a convolutional neural network or other algorithm to identify key facial features (eyes, nose, mouth, ears, etc.) and ensures that the document is properly aligned. This process can be helpful in some configurations of the systems because it is not guaranteed that data such as a user-supplied document will be properly oriented. The Machine Readable Zone ("MRZ") code of the passport used in this example 604 can be extracted by a second AI data extraction module 605 which can use a technique such as OCR or another method and stored separately as extracted code 606. The code 604 however can come in many other encodings such as bar codes or other individual identifiers. Note that in the case of local government documents the code 604 could represent a driver's license ID. Alternatively, in the case of a corporate document the code 604 could represent an employee number. This can be interpreted sequentially by a data aggregation module 607 to produce output 608 that contains an independent record of biographical data of the user. In some embodiments, the AI data verification module can comprise the open-source tool available at: https://github.com/leedrake5/Passport-Reader. This tool can help visualize how biometric document correction works as described herein.

Figure 6B:
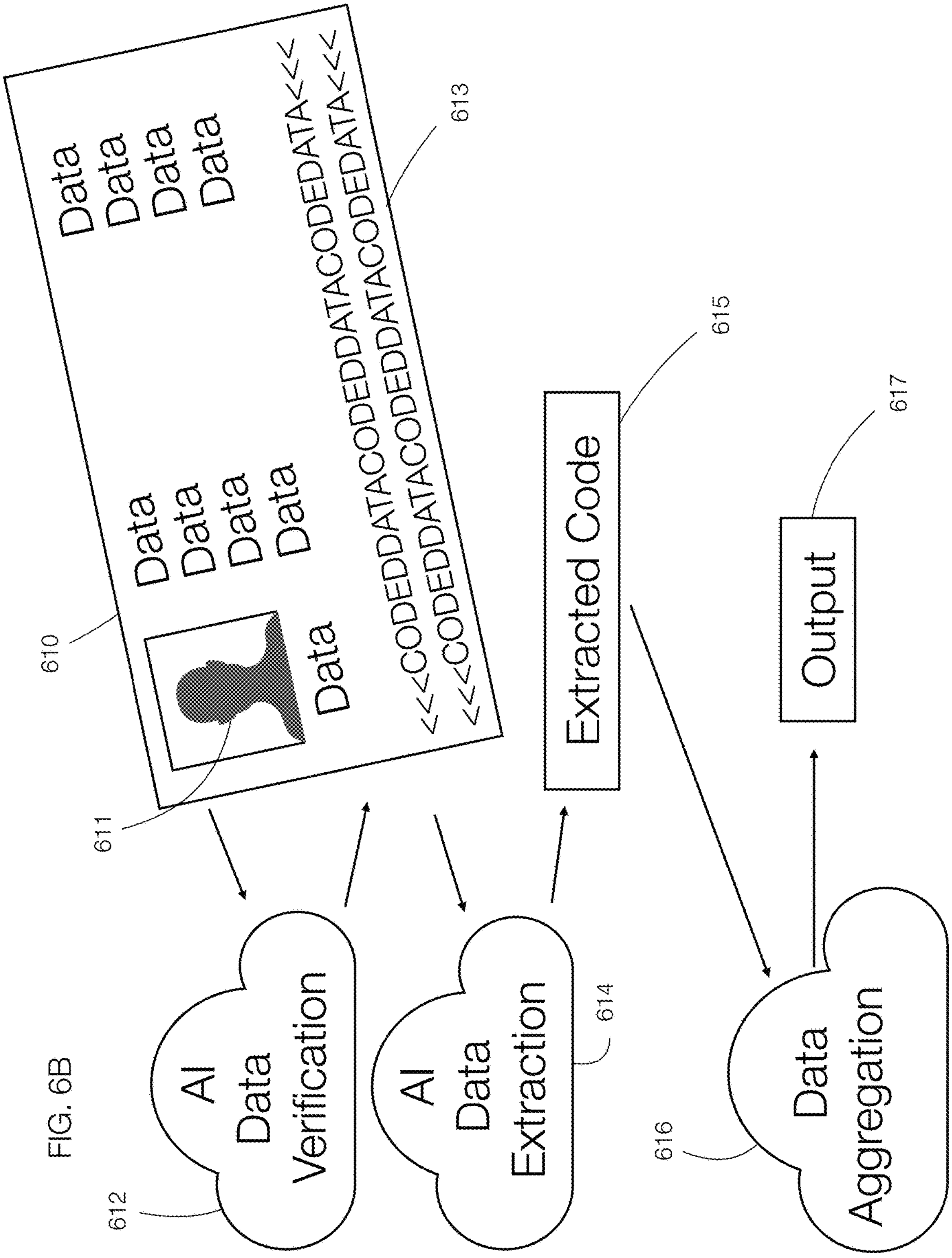
FIG. 6B depicts another example of a user-supplied document with data being input into the systems for automating document creation from digital or analog users.

FIG. 6B shows another configuration of the data verification AI module in the systems for automating the document creation from digital or analog user input. A government document 610 with a photo 611 is input into an AI data extraction module 602. An AI data verification module 612 corrects the alignment of the code 613 despite the skew and/or poor quality of the government or corporate document 610 to send to AI data extraction module 614 that in turn produces extracted code 615. The AI data verification module 612 corrects the skew by using one or more biometric or layout elements of the document. This extracted code 615 is then evaluated in the data aggregation module 616 that produces output 617 which can be cross-referenced with user-inputted data. The AI face recognition employed in the AI data verification module 612 is capable of aligning the document 610 in such a way that the code 613 can be interpreted via a technique such as OCR in the data extraction module 604 despite the skew of the document 610. In one potential embodiment of the AI data verification module, a face detection algorithm identifies the pixel coordinates of key features such as eyes, nose, and mouth. The AI data verification module then uses key ratios between these biometrics to correct angles in pixel coordinates to conform to known dimensions, and re-aligns documents based on the difference in angles. Note that the AI data verification module 612 can correct skew of the document 610 using biometrics, layout, or both. In one embodiment using layout, dividers, watermarks, bounding boxes, and expected text can be used to generate angle differences which can be used by the module 612 to correct skew. The system comprises receipt of data extracted 613 from user-inputted documents 401, 410, 411, an AI face recognition technique is employed in the AI data verification module for detecting and tracking the position of the face in the captured image, and an AI data extraction module 614 for interpreting code (such as MRZ) based on the detected position of the face. The AI data verification module 612 can also accomplish skew correction using layout of the document. In one embodiment in which biometrics are used, the method involves capturing an image of the document, detecting and tracking the position of the face in the captured image using AI face recognition in the AI data verification module, and interpreting the MRZ code based on the detected position of the face using the AI data extraction module. Note that in the event that a document 610 is not properly aligned based on a facial-recognition AI 611, 612, the document can be flagged or properly re-oriented if possible prior to text analysis in the AI data extraction module 614. The document may also have skew correction accomplished not by biometric data but instead by known properties of the expected document layout in the AI data verification module 612.

The fully or partially automatic re-orienting images of documents 610 can be helpful in order to facilitate OCR or other text recognition methods 614, 615. The system includes an AI data verification module that is trained to recognize the orientation of the document based on various visual cues, such as facial features in a photograph, the location of printed text, logos, or other distinguishing features 611. This AI data verification module 612 employs machine learning algorithms capable of analyzing the document's structure and content to determine its most likely correct orientation. By doing so, the AI data verification module 612 ensures accurate text extraction 615 from passport documents and other similarly formatted materials. Once the orientation of the document has been determined, the AI data verification module applies a series of image processing techniques to correct any skew or distortion in the image, thereby ensuring that the text is presented in a standardized format that is optimized for data extraction 614. This approach significantly improves the accuracy and efficiency of data extraction 614, particularly in cases where photos of the document are not properly aligned 610.

In some embodiments, the methods described herein can verify documents by comparing data elements extracted from input documents 413 with corresponding user inputs 414 from an initial submission 410. The comparison can be performed using any computer program that identifies discrepancies between the extracted data and the reference data 415. If any discrepancies are detected, the user may be notified of the errors, enabling them to correct or clarify the information 411 in the output document 416 before submission. Additionally, the user with errors or other discrepancies identified by the AI data verification module can be flagged internally in the document tracker to affect prioritization. This process reduces the likelihood of human error and ensures accurate transmission of data and information as well as an efficient system that can maximize document outputs with resource constraints.

Figure 7A:
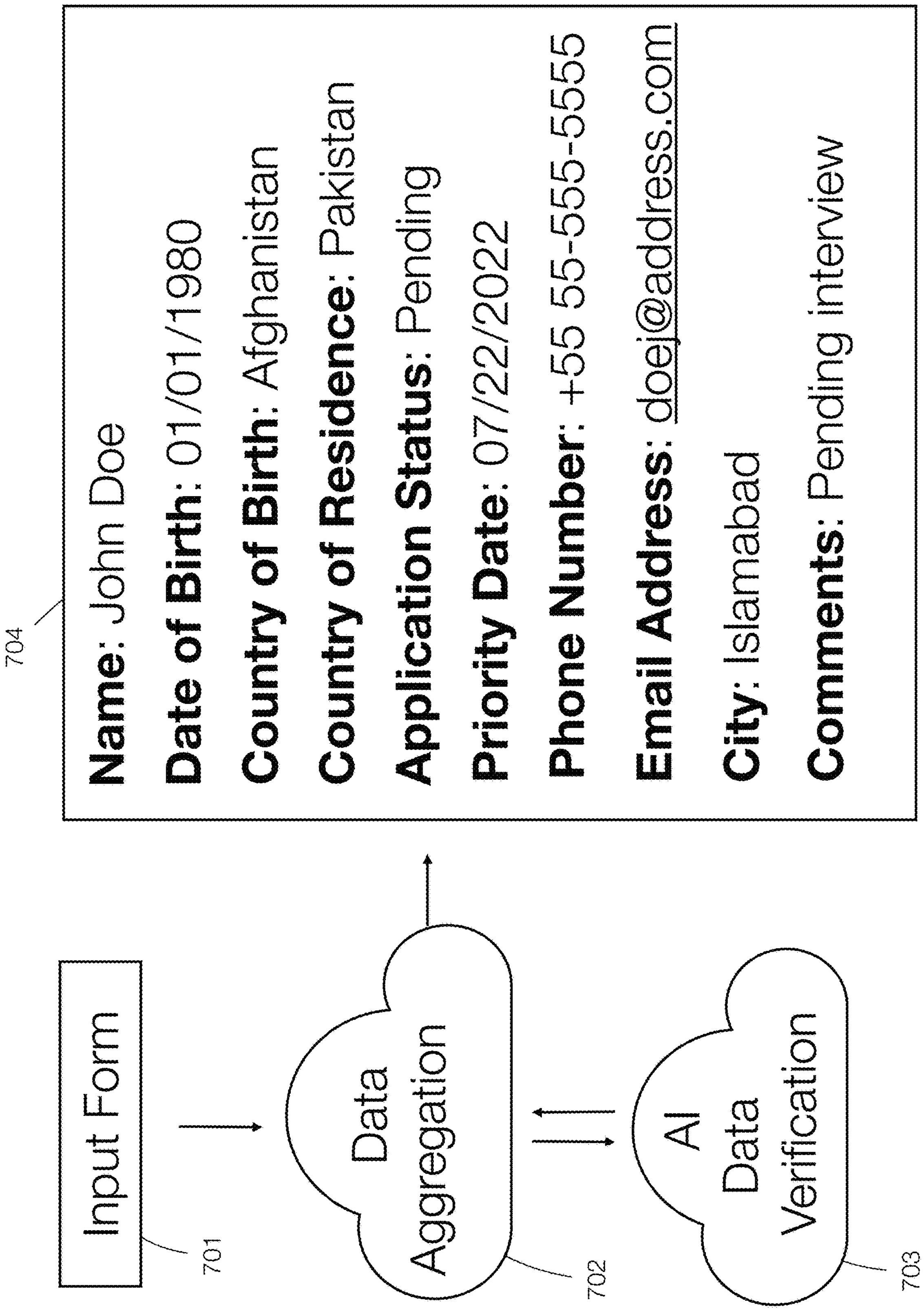
FIG. 7A illustrates an output from the systems for automating document creation from digital or analog users following verification.

FIG. 7A illustrates some embodiments of a document output following AI verification. User-inputted data 701 can include both documents and user data. These are sent to a data aggregation module 702 to perform aggregation tasks which may be located on a cloud server or local device. Following AI data verification 703, an output form 704 is generated that is appropriate to an administrative process.

Figure 7B:
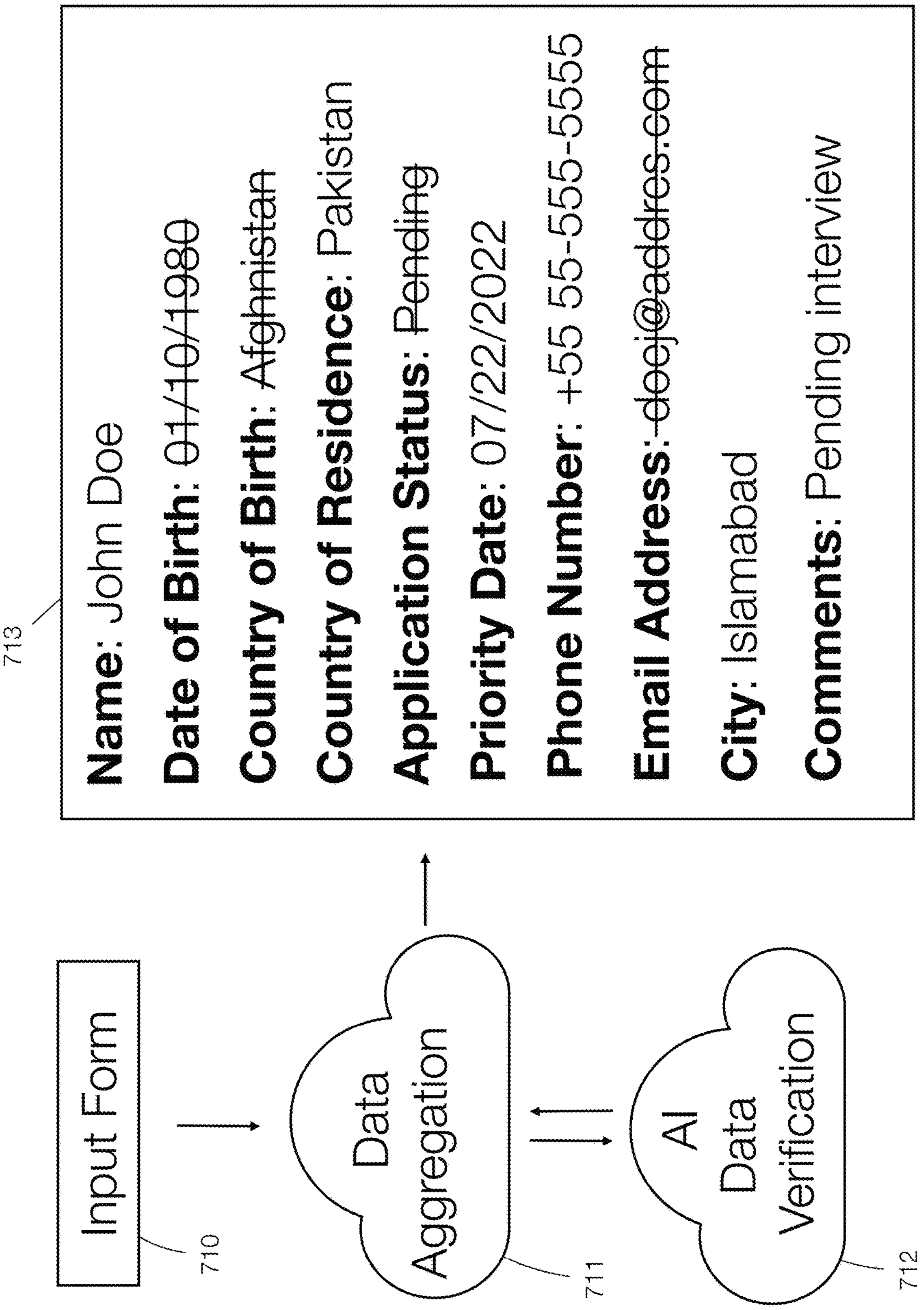
FIG. 7B illustrates error detection in the output from the systems for automating document creation from digital or analog users following verification.

FIG. 7B illustrates some embodiments of error detection in document output following AI data verification. User-inputted data 710 includes both documents and biographical data. These are sent to a data aggregation module 711 which may be located on a cloud server or local device. Following AI data verification 712 an output form 713 is generated that is appropriate to an administrative process. However errors are identified between user-supplied details such as birthdate, country of birth, application status, and email address 713. These flags indicate that the document is not in fact ready, and that additional clarification or other inputs from the user are needed. These flags can also be incorporated into the document tracker module and influence prioritization of a given task for the user. Document output 713 could represent official paperwork needed for administrative tasks by government or corporate organizations.

AI document validation can be assessed on output documents as well as from input documents. Following the same process of data received from an input form 710, transmission to a data aggregation module 711, and following processing in an AI data verification module 712 the output document may still contain errors identifiable only after later data from the user 411, which could include passports, national IDs, and other official and definitive documents issued by government or corporate entities. Errors and other discrepancies flagged in the output 713 can necessitate further clarification from the user or their representative. Resubmission can continue in the manner presented in the schematic FIG. 4B until document output is satisfactory 704 following the same pathway of user input 701, data aggregation 702, and AI data verification 703. Document output 704 could represent official paperwork needed for administrative tasks by public or private entities.

Figure 8:
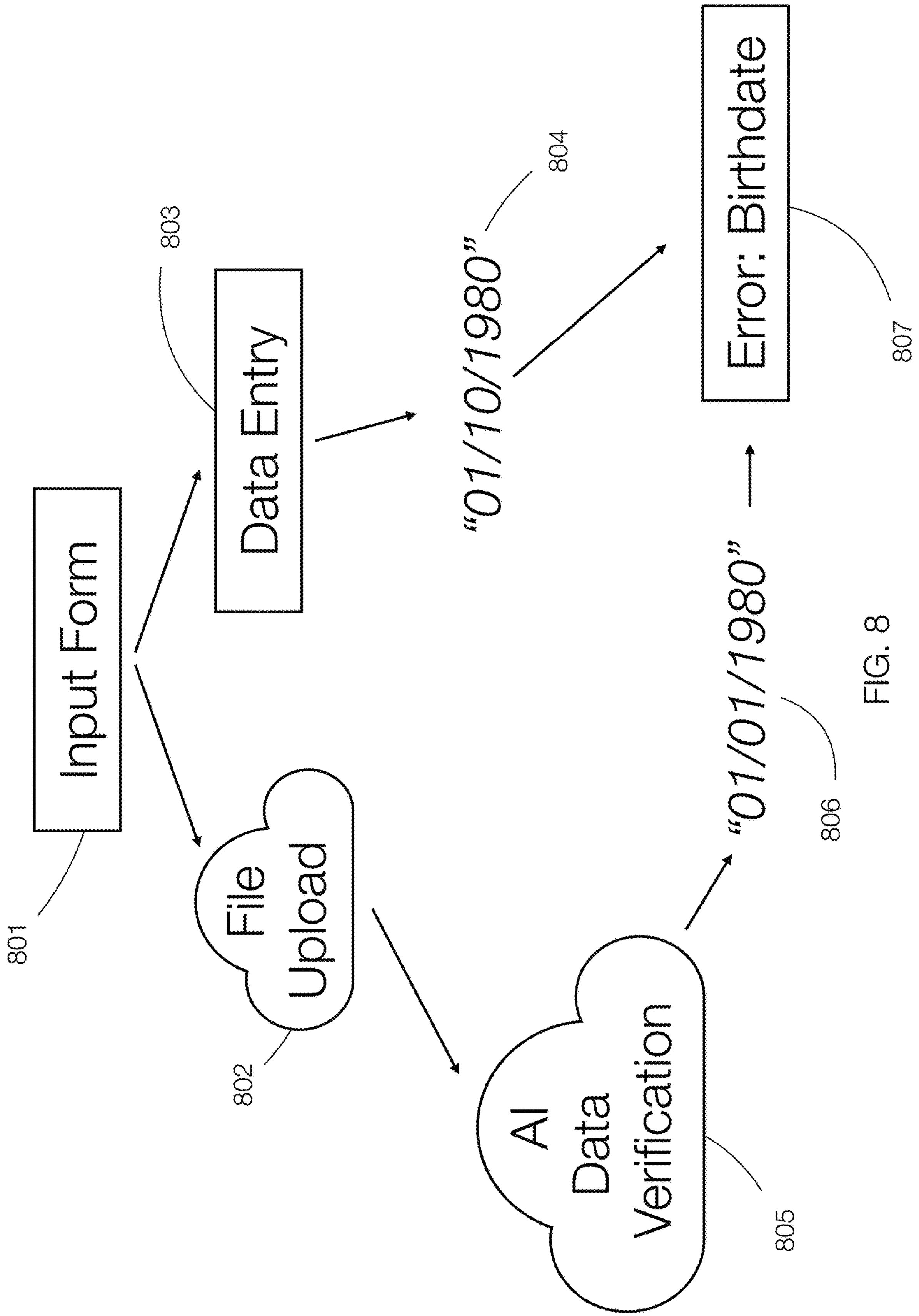
FIG. 8 shows yet other embodiments of the methods for automating document creation from digital or analog users using verification.

FIG. 8 illustrates some embodiments of the methods for automating the document creation from digital or analog user input herein. In these embodiments, data is received from the input form 801 which includes user-supplied documents 802 and user-inputted data via alphanumeric characters 803, including details such as a user's self-reported birthdate 804. User-supplied documents 802 can then be processed by an AI data verification module 805 which can be used independently or to cross-reference user-inputted data 803, including a document-extracted birthdate 806. The user-supplied birthdate 804 and AI extracted birthdate 806 may not match and generate an error flag 807. This error flag can be used in multiple ways, including to generate a request for correction or clarification to the user, or alternatively to flag their record as requiring more assistance and affect prioritization.

In other embodiments, an AI data verification module 805 extracts a birthdate 806 from a user-supplied document 802 such as a passport. Separately, a user-supplied birthdate 804 from their own data entry 803 conflicts with the AI document extracted birthdate 806. In this hypothetical example, the mismatch between the two dates is detected, an error flag is raised 807, thereby alerting the system of potential inconsistencies in the provided data. This cross-referencing process ensures accurate and reliable verification of the user's identity based on their birthdate (or other biographical) information.

The AI data verification module and/or the AI data extraction module can contain and use any algorithm or machine learning process that aids in the data verification or extraction process. In some embodiments, AI data verification module and/or the AI data extraction module can contain and use one or more of the following algorithms: deeply interconnected neural networks; convolutional neural networks; gradient boosting; support vector machines; and random forests.

The systems and methods described herein overcome a problem that exists in some known methods for automating data inputs. One problem in automating data inputs is verification of accurate information. User input data at any scale will have an error rate. If materials are submitted under duress, such error rates may be higher and thus act as an additional barrier when none can be afforded. By having users submit verification documents, which can include but are not limited to passports, national identification documents, birth certificates, marriage certificates, etc., these documents can serve as a check on information manually entered into the portal. Either through manual review or automated review using one or more AI modules, these documents can be checked and used to verify, revise, or substitute for user-inputted values.

Such automated verification can be used as a substitute for user-supplied information, or as a means of flagging when user-submitted information is incorrect. For example, a user may supply a birthdate that contradicts the one listed in an official document such as a passport or national ID. This discrepancy of key biographical data can serve as a flag on the record that can highlight other potential inaccuracies for further automated or manual review.

One automation example that can be performed by the systems and methods described herein is when a user inputs data enters into a form, which could be connected to a web page or application as part of a customer relationship management system (CRM) or stand-alone system. This data gets divided into data inputs (alphanumeric characters) and files such as PDFs or image scans of physical documents. Data inputs can be formatted and stored in a database either in the cloud or locally, in preparation for input into output files such as PDFs or printed documents. Input documents can go through additional verification steps to verify user-inputted data stored in the database. This process can be iterated multiple times, with revised data and new files and verification as needed. A document tracker, deployed locally or on the server, tracks progress for files for assessing completeness of task. When complete and verified, the data can be output to legal paperwork that is prepared for signatures.

Another automation example could relate to multiple users' input. In this example, a client and one or more legal professionals could enter data into a form, which could be connected to a web page or application as part of a CRM or some other stand-alone system. This data can be divided into data inputs (alphanumeric characters) and files. Data inputs can be formatted and stored in a database(s) either in the cloud or locally in preparation for input into output files such as PDFs. Input documents can go through additional verification steps to verify multiple user-inputted data stored in databases. This process can be iterated as many times as needed, with updated/revised data and new files and verification as needed. Document trackers, deployed locally or on the server, can track progress for files for assessing work done to date. When complete and verified, the data can be output to legal paperwork that is prepared for signatures of all or some initial users and other parties.

These implementations serve as back-end data processing for a front-end process that could be either a standalone webpage, a standalone application on a computer or portable device, or a component of an integrated CRM. The advantages of integration with a CRM are numerous, as these can integrate email and phone communications with data, both alphanumeric and files input into a front end while the backend system disclosed here can update the CRM.

The distinction between local device and cloud server is simply where the input data is stored. Both a local device and cloud server are computers with a central processor, RAM, and storage space that have access point with proper credentials. The distinction becomes important for proximity: servers require specialized software for interrogation while local computers have a user interface as part of its operating system.

The examples and embodiments are described only by way of examples; they are not meant to limit the scope of the systems and methods described herein. Multiple variations of these examples and embodiments will be clear to those skilled in the art, and are considered to be within the scope of the subject matter described herein. For example, some steps or acts in a process or method may be reordered or omitted, while features and aspects described in respect of one embodiment(s) may be incorporated into other described embodiment(s). While the some of the foregoing examples were described and illustrated with reference to a desktop computer, they may be implemented with suitable modification on a personal phone with a touchscreen interface. Likewise, foregoing examples which included a touchscreen interface may also be accomplished with a full desktop system. Server implementations may not feature any user interface whatsoever, and may only include command-line only controls.

In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, the examples and embodiments, in all respects, are meant to be illustrative only and should not be construed to be limiting in any manner.

The invention claimed is:

1. An automated data verification system, comprising:

an input module for accepting multiple or single user input of data;

a centralized server for storage of user data based on the type of inputted user data;

a AI data verification module capable of configured to adjust document dimensions, skew, brightness, contrast, color palette, encoding, and resolution based on features in the documents submitted with the user data;

a AI data extraction module capable of extracting text, code, or other symbols from the verified user data;

a data aggregation module capable of integrating extracted data from verified user data with user supplied information and automated verification of user-inputted data on the cloud server by cross-referencing the AI verified documents with user-supplied information;

a tracking module for tracking the progress of creating verified user data; and a document output module configured for generating new documents from the validated user data using predefined templates.

2. The system of claim 1, further comprising a compilation module for compiling the generated documents to facilitate access and collaboration among one or more users and their representatives.

3. The system of claim 1, wherein the features include biometric information in images of the user data.

4. The system of claim 3, wherein the biometric data includes eyes, nose, face features or shape, fingerprints, finger vein patterns, and/or hands.

5. The system of claim 3, wherein the AI data verification module adjusts the documents in the user data based on the identification of features to correct for skew or other error which could impair document readability/interpretability.

6. The system of claim 1, wherein the AI data extraction module extracts data from government documents comprising MRZ codes, bar codes biographical data, issuing authorities, dates of issue and expiration, and/or nationality.

7. The system of claim 1, wherein the document output module further integrates the extracted data with manual or automated data input from one or more users for verification or substitution of the original data.

8. The system of claim 1, wherein the AI data verification module and/or the AI data extraction module contains one or more of the following algorithms: deeply interconnected neural networks, convolutional neural networks, gradient boosting, support vector machines, and random forests.

9. The system of claim 1, wherein the features include layout information in images of the user data.

10. The system of claim 9, wherein the layout information include headings, bounding boxes, watermarks, pre-identified text or numbers, and/or line dividers.

* * * * *